United States Patent
Dashevskiy et al.

(10) Patent No.: US 11,546,327 B2
(45) Date of Patent: Jan. 3, 2023

(54) BEHAVIOR-BASED PHOTO IDENTIFICATION

(71) Applicant: T-Mobile USA, Inc., Bellevue, WA (US)

(72) Inventors: Tatiana Dashevskiy, Edmonds, WA (US); Rami Al-Kabra, Bothell, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 188 days.

(21) Appl. No.: 15/971,074

(22) Filed: May 4, 2018

(65) Prior Publication Data
US 2019/0342287 A1 Nov. 7, 2019

(51) Int. Cl.
*H04L 29/06* (2006.01)
*H04L 9/40* (2022.01)
*G06T 11/20* (2006.01)

(52) U.S. Cl.
CPC .......... *H04L 63/0861* (2013.01); *G06T 11/20* (2013.01); *H04L 63/1425* (2013.01)

(58) Field of Classification Search
CPC ........ G06F 21/00; G06F 16/583; G06F 21/31; G06F 21/32; G06F 21/62; G06F 2221/2113; G06F 2221/2117; G06F 3/04883; H04L 63/0861; H04L 63/1425; G06T 11/20; H04W 12/06; H04W 12/68
See application file for complete search history.

(56) References Cited

U.S. PATENT DOCUMENTS

| | | | | |
|---|---|---|---|---|
| 6,633,223 B1 * | 10/2003 | Schenker | ............... | G07C 1/10 340/5.53 |
| 9,282,090 B2 * | 3/2016 | Liberman | ............ | H04L 9/3231 |
| 9,454,665 B1 * | 9/2016 | Wren | ................. | G06F 21/6263 |
| 9,741,085 B2 * | 8/2017 | Avni | .................... | G06T 1/0021 |
| 10,198,524 B1 * | 2/2019 | Amalapurapu | ....... | G06F 16/958 |
| 10,616,226 B2 * | 4/2020 | Borunda | ............ | H04L 63/0807 |
| 10,826,900 B1 * | 11/2020 | Poder | ................. | H04L 63/0876 |

(Continued)

FOREIGN PATENT DOCUMENTS

CN   103646375 A   *  3/2014

OTHER PUBLICATIONS

Richard Han et al., Dynamic adaptation in an image transcoding proxy for mobile Web browsing (Year: 1998).*

(Continued)

*Primary Examiner* — Carl G Colin
*Assistant Examiner* — Andrew Suh
(74) *Attorney, Agent, or Firm* — Lee & Hayes, P.C.

(57) ABSTRACT

A computing system may generate and/or use a behavior photographic identification ("behavior photo ID") that is based, at least in part, on anonymized parameters related to the behavior of a person. The behavior can include a history of phone calls, texts, or internet browsing. The behavior photo ID, which may be used to uniquely identify the person, may digitally modify a digital photo to encode behaviors or activities of the person. In some implementations, the behavior photo ID may be modified periodically, or from time to time, to produce an updated behavior photo ID that reflects new external events as well as relatively recent behaviors or activities of the person.

17 Claims, 4 Drawing Sheets

(56) References Cited

U.S. PATENT DOCUMENTS

| | | | |
|---|---|---|---|
| 2003/0093667 A1* | 5/2003 | Dutta | G06Q 20/3678 |
| | | | 713/161 |
| 2003/0179405 A1* | 9/2003 | Seto | H04N 1/00132 |
| | | | 358/1.15 |
| 2005/0117776 A1 | 6/2005 | Powell et al. | |
| 2008/0201638 A1* | 8/2008 | Nair | H04W 4/029 |
| | | | 715/706 |
| 2009/0034622 A1 | 2/2009 | Huchet et al. | |
| 2009/0041353 A1* | 2/2009 | Hoff | G06F 16/9554 |
| | | | 382/183 |
| 2011/0194727 A1 | 8/2011 | Guo et al. | |
| 2014/0282964 A1* | 9/2014 | Stubblefield | H04L 63/083 |
| | | | 726/7 |
| 2014/0306814 A1* | 10/2014 | Ricci | B60C 1/00 |
| | | | 340/425.5 |
| 2014/0320391 A1* | 10/2014 | Bazaz | H04W 52/0277 |
| | | | 455/574 |
| 2014/0359298 A1 | 12/2014 | Carlson et al. | |
| 2015/0046989 A1* | 2/2015 | Oberheide | G06F 21/44 |
| | | | 726/6 |
| 2015/0332065 A1 | 11/2015 | Li et al. | |
| 2016/0171209 A1* | 6/2016 | Perez | G06F 21/45 |
| | | | 726/6 |
| 2016/0241592 A1* | 8/2016 | Kurkure | H04L 63/08 |
| 2017/0140174 A1* | 5/2017 | Lacey | G06F 21/6245 |
| 2018/0270260 A1* | 9/2018 | Govardhan | G06N 20/00 |
| 2019/0199759 A1* | 6/2019 | Anderson | G06F 21/32 |

OTHER PUBLICATIONS

PCT Search Report and Written Opinion dated Aug. 7, 2019 for PCT Application No. PCT/US2019/027191, 11 pages.

* cited by examiner

BEHAVIOR-BASED PHOTO IDENTIFICATION

BACKGROUND

Computer systems provide a user with access to information and display imagery. Generally, access to certain types of information may be limited to certain persons (users) by some sort of access system. An example is an automated bank teller machine (ATM) where the user is granted access and permitted to withdraw money only after presenting identification information via an ATM card and a password. Another example is a computer in which user preferences, as well as file/information or access, is presented based upon the identity of the user based on a user name and password. The user name and password are then recognized by the system and used to invoke certain predefined user preferences unique to that user name and password. Yet another example of a technique for identifying a user includes the use of fingerprint recognition sensors, which may be located on a portable device, to identify a user via the user's scanned, or imaged, fingerprint.

BRIEF DESCRIPTION OF THE DRAWINGS

The detailed description is set forth with reference to the accompanying figures, in which the left-most digit of a reference number identifies the figure in which the reference number first appears. The use of the same reference numbers in different figures indicates similar or identical items or features.

DETAILED DESCRIPTION

Described herein are techniques and architectures that allow a computing system to generate and/or use a behavior photo identification ("behavior photo ID") of a person. The behavior photo ID may be based, at least in part, on the behavior of the person, such as, for example, an anonymized version of their history of phone calls, texts, or internet browsing. In some implementations, the behavior photo ID may be a photograph that is digitally modified to encode behaviors or activities of the person. In some implementations, the behavior photo ID may be modified periodically to produce an updated behavior photo ID that reflects recent changes in behaviors or activities of the person.

In addition to the benefits of such a behavior photo ID indicated above, another benefit may be that implementations of the behavior photo ID for a person need not require the person to make a special effort to enter or provide additional identifying input to a requesting system. Thus, implementations of a behavior photo ID may lend themselves to situations where the person's activities are best not interrupted, or otherwise disturbed, for purposes of providing a necessary identification input.

Figure 1:
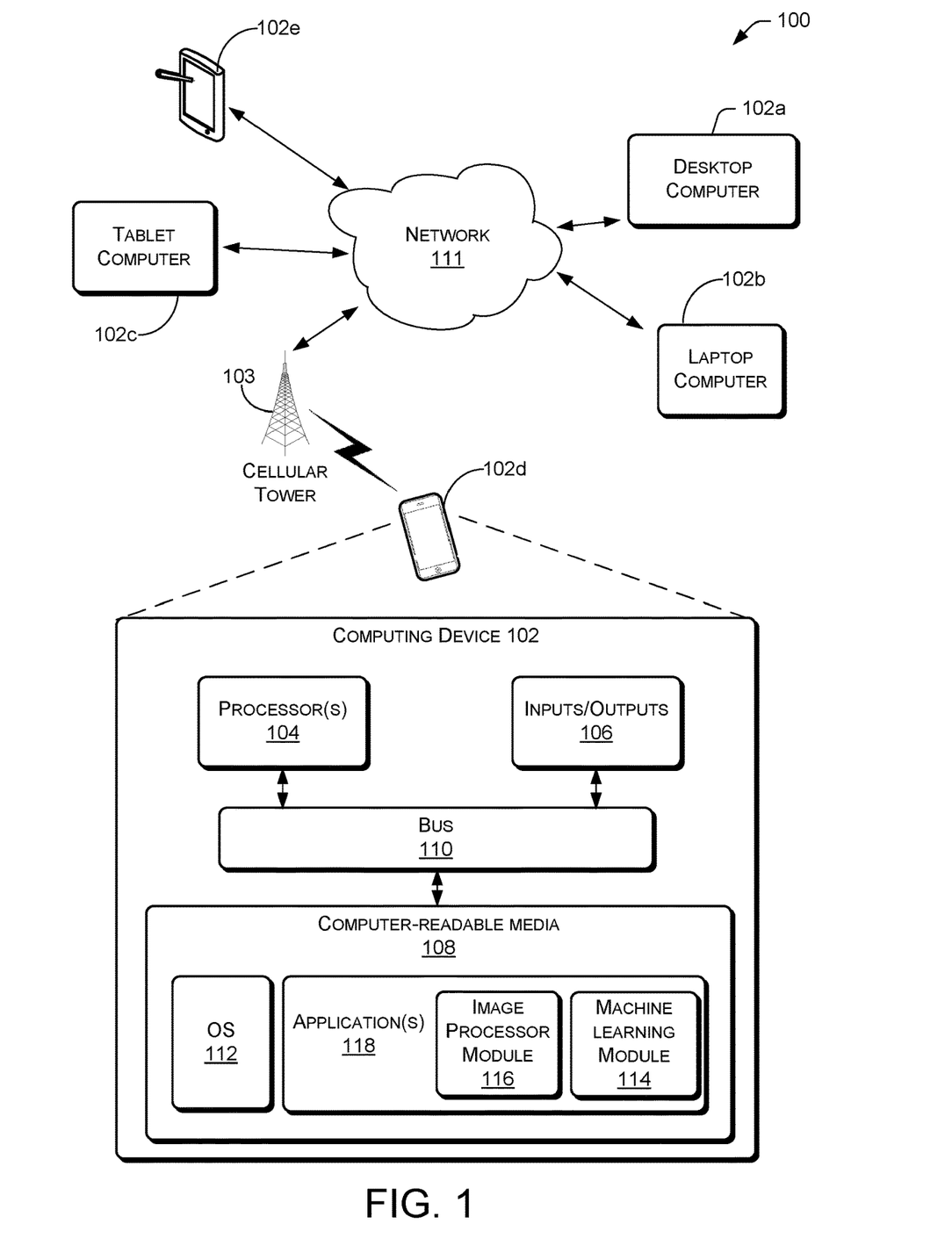
FIG. 1 schematically illustrates a wireless communication system, in accordance with some examples of the present disclosure.

FIG. 1 schematically illustrates an example of a computing and communication system 100 (hereinafter referred to as "system") that may include and be accessed by computing devices 102 (which may be mobile). System 100 may include multiple nodes and networks (not illustrated). By way of example and not limitation, computing devices 102 may include devices 102a-102e. Although illustrated as a diverse variety of device types, computing devices 102 can be other device types and are not limited to the illustrated device types. Computing devices 102 can comprise any type of device with one or more processors 104 operably connected to one or more inputs/outputs 106 and computer-readable media 108 via one or more buses 110. Computing devices 102 may include personal computers such as, for example, desktop computers 102a, laptop computers 102b, tablet computers 102c, mobile devices 102d (e.g., cellular phones), personal digital assistants (PDAs) 102e, electronic book readers, wearable computers (e.g., smart watches, personal health tracking accessories, augmented reality and virtual reality devices, etc.), automotive computers, gaming devices, etc. Computing devices 102 can also include, for example, server computers, thin clients, terminals, and/or work stations. In some examples, computing devices 102 can include components for integration in a computing device, appliances, or other sorts of devices.

In some examples, computing device 102 may be a mobile device 102d in a cell serviced by a cellular tower 103. The mobile device 102d may comprise any device for communicating over a wireless communication network. Such devices include mobile telephones, cellular telephones, mobile computers, personal digital assistants (PDAs), radio frequency devices, handheld computers, laptop computers, tablet computers, palmtops, pagers, as well as desktop computers, devices configured as internet of things (IoT) devices, integrated devices combining one or more of the preceding devices, and/or the like. As such, mobile devices 102d may range widely in terms of capabilities and features. For example, the mobile device 102d may have a numeric keypad, a capability of displaying only a few lines of text and can be configured to interoperate with a particular type of network networks (e.g., the global system for mobile communications, or GSM). However, another mobile device 102d (e.g., a smart phone) may have a touch-sensitive screen, a stylus, an embedded GPS receiver, and a relatively high-resolution display, and be configured to interoperate with multiple types of networks. The mobile device 102d may also include SIM-less devices (i.e., mobile devices that do not contain a functional subscriber identity module ("SIM")), roaming mobile devices (i.e., mobile devices operating outside of their home access networks), and/or mobile software applications.

In some examples, some or all of the functionality described as being performed by computing devices 102 may be implemented by one or more remote peer computing devices, a remote server or servers, or distributed computing resources, e.g., via cloud computing. In some examples, the computing device 102 may comprise an input port to receive electronic communications. The computing device 102 may further comprise one or more processors 104 to access various sources of information related to or associated with particular electronic communications (e.g., phone calls, texts, etc.). Such sources may include electronic calendars and databases of histories or personal information about authors of messages (e.g., texts, emails, etc.) included in the electronic communications, just to name a few examples. In some examples, an author or device user (hereinafter who may be referred to as "person") must "opt-in" or take other affirmative action before any of the multiple processors 104 can access personal information of the author. In some examples, the one or more processors 104 may be configured to produce a behavior photo ID based on the behavior of the author. One or more processors 104 may be hardware processors or software processors. As used herein, a processing unit designates a hardware processor.

In some examples, as shown for the mobile device 102d, computer-readable media 108 can store instructions executable by the processor(s) 104 including an operating system (OS) 112, a machine-learning module 114, an image processor module 116 and programs or applications 118 that are loadable and executable by the processor(s) 104. The one or more processors 104 may include one or more central processing units (CPUs), graphics processing units (GPUs), video buffer processors, etc. In some examples, the machine-learning module 114 comprises executable code stored in computer-readable media 108 and is executable by the processor(s) 104 to collect information, locally or remotely by the computing device 102, via one or more inputs/outputs 106. The information may be associated with one or more of applications 118. The machine-learning module 114 may selectively apply any of a number of machine learning decision models stored in computer-readable media 108 (or, more particularly, stored in machine-learning module 114) to apply to input data.

In some examples, the image processor module 116 comprises executable code stored in computer-readable media 108 and is executable by processor(s) 104 to collect information, locally or remotely by the computing device 102, via one or more inputs/outputs 106. The information may be associated with the one or more of applications 118. The image processor module 116 may selectively apply any of a number of techniques for modifying or encoding an image based on, among other things, a user's behavior.

Though certain modules have been described as performing various operations, the modules are merely examples and the same or similar functionality may be performed by a greater or lesser number of modules. Moreover, the functions performed by the modules depicted need not necessarily be performed locally by a single device. Rather, some operations could be performed by a remote device (e.g., peer, server, cloud, etc.).

Alternatively, some or all of the functionality described herein can be performed, at least in part, by one or more hardware logic components. Hardware logic components that can be used include, for example, field-programmable gate arrays (FPGAs), program-specific integrated circuits (ASICs), program-specific standard products (ASSPs), system-on-a-chip systems (SOCs), complex programmable logic devices (CPLDs), etc.

Computer-readable media 108 can include computer storage media and/or communication media. Computer storage media includes volatile and non-volatile, removable and non-removable media implemented in any method or technology for storage of information such as computer readable instructions, data structures, program modules, or other data. Computer storage media includes, but is not limited to, phase change memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device.

In contrast, communication media embodies computer readable instructions, data structures, program modules, or other data in a modulated data signal, such as a carrier wave, or other transmission mechanism. As defined herein, computer storage media does not include communication media. In various examples, computer-readable media 108 is an example of computer storage media storing computer-executable instructions. In various examples, an input device connected to the one or more inputs/outputs 106 can include a direct-touch input device (e.g., a touch screen), an indirect-touch device (e.g., a touch pad), an indirect input device (e.g., a mouse, keyboard, a camera or camera array, etc.), or another type of non-tactile device, such as an audio input device.

The one or more inputs/outputs 106 can also include one or more communications interfaces to enable wired or wireless communications between computing device 102 and other networked computing devices that may be involved in producing and/or validating a behavior photo ID. Such communications interfaces may include one or more transceiver devices, e.g., network interface controllers (NICs) such as Ethernet NICs or other types of transceiver devices, to send and receive communications over a network. In various configurations, a wireless communication network of system 100 may be configured as one of many types of networks and thus may communicate with (mobile) devices (e.g., mobile device 102d) using one or more standards, including but not limited to, GSM, time division multiple access (TDMA), universal mobile telecommunications system (UMTS), evolution-data optimized (EVDO), long term evolution (LTE), generic access network (GAN), unlicensed mobile access (UMA), code division multiple access (CDMA) protocols (including IS-95, IS-2000, and IS-856 protocols), advanced LTE or LTE+, orthogonal frequency division multiple access (OFDM), general packet radio service (GPRS), enhanced data GSM environment (EDGE), advanced mobile phone system (AMPS), WiMAX protocols (including IEEE 802.16e-2005 and IEEE 802.16m protocols), high speed packet access (HSPA), (including high speed downlink packet access (HSDPA) and high speed uplink packet access (HSUPA)), ultra-mobile broadband (UMB), and/or the like. In examples, the network 111 can include an internet protocol multimedia subsystem (IMS) and thus, may provide various services such as, for example, voice over long term evolution (VoLTE) service, video over long term evolution (ViLTE) service, rich communication services (RCS), and/or web real time communication (Web RTC).

The processor 104 (e.g., a processing unit) may exchange data via the one or more inputs/outputs 106 (e.g., through one or more wired or wireless communications interfaces).

The communications interfaces may include a wired I/O interface, such as an Ethernet interface, a serial interface, a universal serial bus (USB) interface, an INFINIBAND interface, or other wired interfaces. For simplicity, these and other components are omitted from the illustrated computing device 102 and simply shown as the one or more inputs/outputs 106. The inputs/outputs 106 can also include other devices such as user input peripheral devices (e.g., a keyboard, a mouse, a pen, a game controller, a voice input device, a touch input device, gestural input device, etc.) and/or output peripheral devices (e.g., a display, a printer, audio speakers, a haptic output, etc.).

Figure 2:
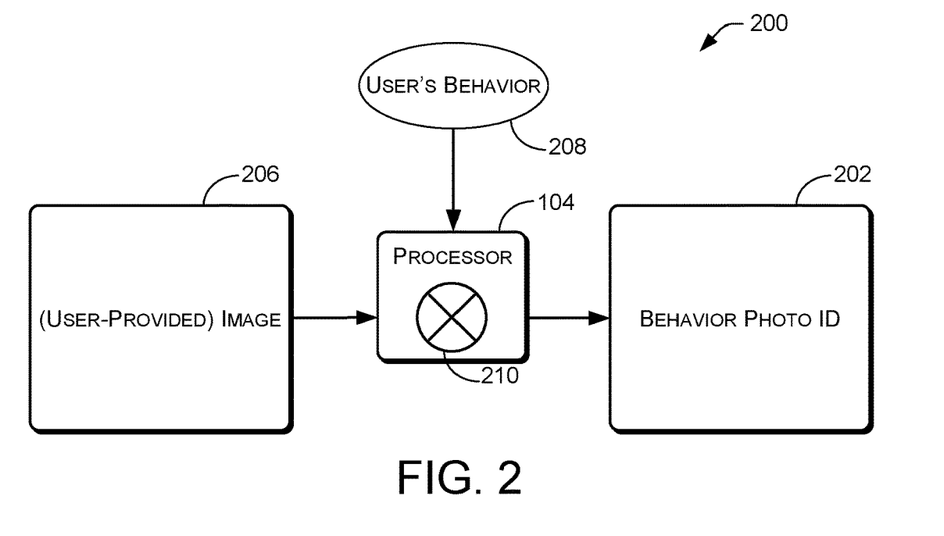
FIG. 2 is a block diagram illustrating a process for producing a behavior photographic identification ("behavior photo ID"), in accordance with some examples of the present disclosure.

FIG. 2 is a block diagram illustrating a process 200 for producing a behavior photo ID 202 for a person, in accordance with some examples of the present disclosure. Such a process 200, which may be performed by a processor 104 (e.g., processor(s) 104), may modify an image 206 (herein, unless otherwise specified or implied by context, the word "image" is interchangeable with the word "photo") to produce or generate the behavior photo ID 202. Modification may be based, at least in part, on the user's behavior 208. The image 206 may be provided by the user, who may be a user of a mobile device (e.g., mobile device 102d) such as a cellular phone, for example. The image 206 may be an image of the person or any of a number of possible images. The person may desire to provide the image 206 depicting an object (e.g., person, animal, feature, etc.) that has particular meaning to the person. Generally, the image 206 will be an image of the person's face, which is typically considered to be most appropriate for an ID, though claimed subject matter is not limited to this configuration.

The processor 104 may receive one or more parameters associated with the user's behavior 208. For example, such parameters may be values representative of the person's text messaging (e.g., frequency of outgoing and incoming texts, number of texts, destination phone numbers, etc.), phone calls (e.g., frequency of outgoing and incoming calls, number of calls, calls' phone numbers, etc.), internet browsing, etc. The processor 104 may use such parameters in a function module 210, which may comprise executable code (e.g., in computer-readable media 108) that anonymizes and/or encrypts data related to the user's behavior and modifies or encodes the image 206 based on one or more parameters, as described below. Thus, the function module 210 may apply the one or more anonymized parameters associated with the user's behavior 208 to the image 206, resulting in the behavior photo ID 202.

In some examples, the processor 104 may receive one or more updated or new parameters associated with the user's behavior 208. The processor 104 may be configured to periodically poll behavior-related information stored in a memory (e.g., computer-readable media 108). Such a process 200 may, for example, modify the behavior photo ID 202 to produce or generate an updated or modified behavior photo ID. The process 200 may use information that has been updated in response to occurrences of any of a number of events (on any or multiple devices) related to the user's behavior 208. For example, behavior-related information may be updated or otherwise modified using anonymized data associated with the person receiving a text message, a phone call, visiting a web page on the Internet, etc. In view of such updates, the processor 104 may modify the person's behavior photo ID 202 to produce an updated behavior photo ID 202. This may occur periodically, upon request, or in response to one of these occurrences. In some implementations, updating may be based, at least in part, on any number of environmental factors and/or behavioral responses by the person. Such an updating process may be performed randomly, periodically, in response to relatively significant environmental and/or behavioral changes, or in response to a request by the person, among other things.

In some examples, the processor 104 may receive one or more updated or new machine learning-based parameters associated with the user's behavior 208. The machine learning-based parameters may be based at least in part on a machine learning model using data associated with a history of the user's behavior 208. In view of such updates, the processor 104 may modify the person's behavior photo ID 202 to produce an updated behavior photo ID 202.

Figure 3:
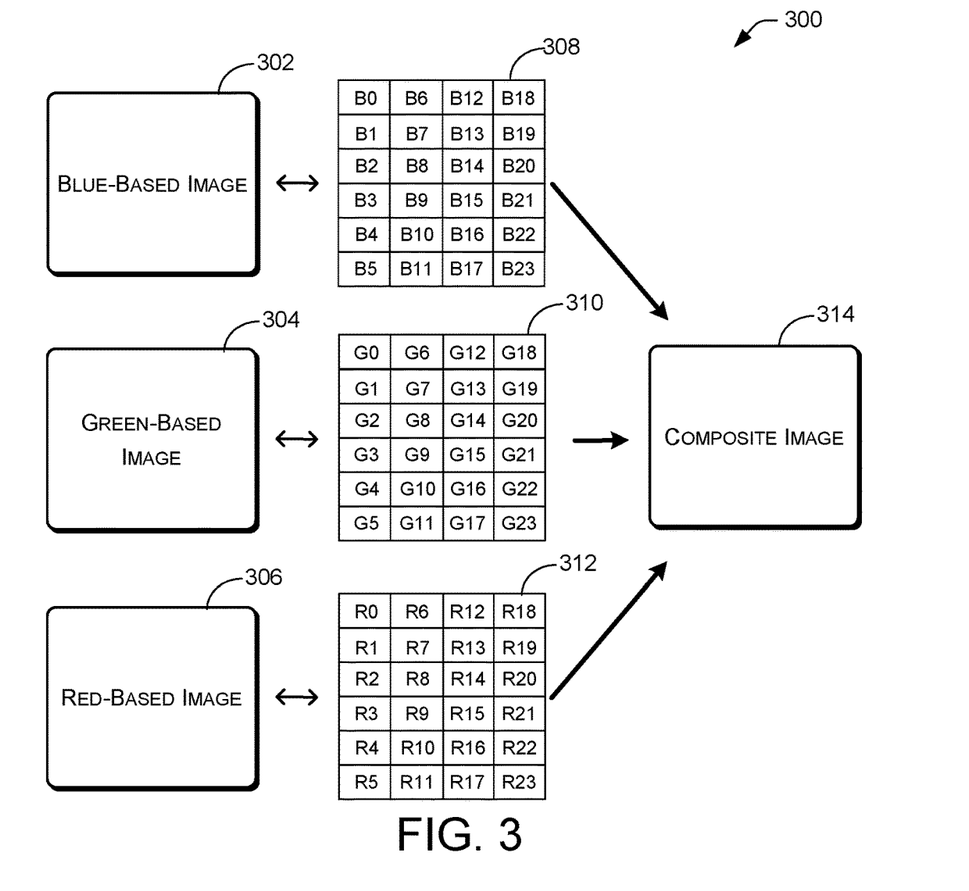
FIG. 3 schematically illustrates a process for digitally encoding a photo, in accordance with some examples of the present disclosure.

FIG. 3 schematically illustrates a process 300 for digitally encoding a photo or image, such as image 206 illustrated in FIG. 2, for producing a behavior photo ID 202 for a person, according to various examples. Process 300 is one example of a number of other possible processes, and claimed subject matter is not so limited. Process 300—which may be performed by a processor (e.g., processor 104)—may decompose the image 206 into, for example, a blue-based image 302, a green-based image 304, and a red-based image 306. The processor 104 may individually modify each of these images 302-306 by any of a number of techniques. In a particular implementation, each of these images 302-306 may be modified based, at least in part, on values that can be applied to the images 302-306 via a function (e.g., function module 210). Examples of such values are illustrated in FIG. 3 as blue-image values 308, comprising values B0-B23 (though these numbers are merely examples), green-image values 310, comprising values G0-G23, and red-image values 312, comprising values R0-R23.

In some examples, the values 308-312 may be generated using a machine learning model that uses anonymized and/or encrypted data associated with the user's behavior 208. In some examples, individual values may be respectively associated with particular traits of behavior of the user. For instance, one value may be a mathematical representation (e.g., some type of anonymous quantization) of the person's contacts stored in their phone. Another value may be another mathematical representation of the person's internet browsing history, etc.

The processor 104 may generate modified RGB-based images after applying values 308-312 to individual images 302-306. Subsequently, the processor 104 can combine the modified images to produce a composite image 314, which may be the same as or similar to behavior photo ID 202.

Figure 4:
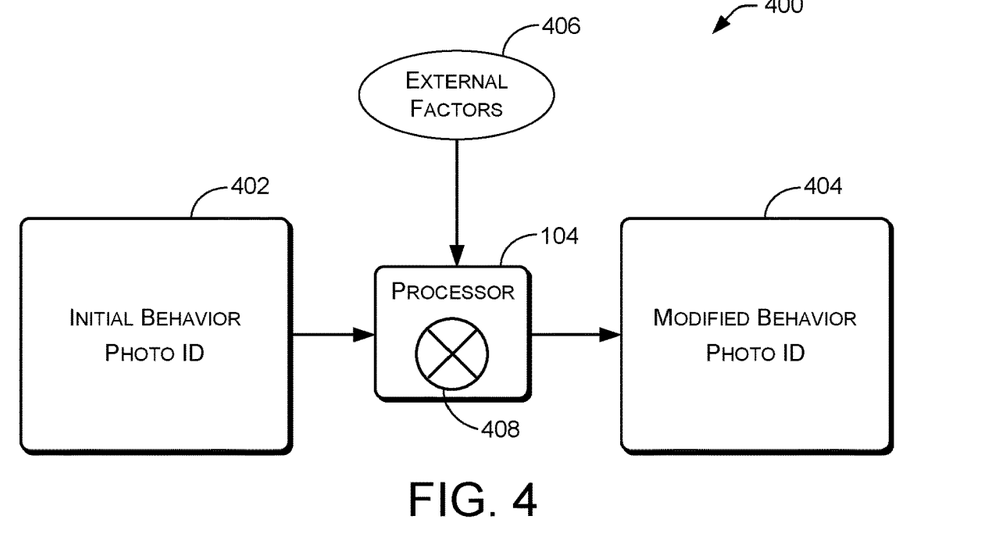
FIG. 4 is a block diagram illustrating a process for modifying a behavior photo ID, in accordance with some examples of the present disclosure.

FIG. 4 is a block diagram illustrating a process 400 for modifying an initial behavior photo ID 402 to produce a modified behavior photo ID 404 for a person, according to some examples. Such a process 400, which may be performed by a processor (e.g., processor 104), may modify the initial behavior photo ID 402 to produce a modified behavior photo ID 404. Process 400 may be similar to process 200, described above, except that the modification is based, at least in part, on external factors 406, as opposed to certain activities of the person. Such external factors 406 can include events and conditions that are independent of actions taken by the person. For example, external factors 406 may include the time of day, weather, world-wide news events, political campaigns, and advertisements, just to name a few examples.

The processor 104 may receive, whether newly acquired or retrieved from memory, one or more parameters associated with the external factors 406. The processor 104 may use these external factors in a function module 408, which may comprise, for example, executable code stored on the computer-readable media 108. The function module 408 may comprise executable code that modifies or encodes the initial behavior photo ID 402 based at least in part on one or more parameters associated with the external factors 406. Thus, the function module 408 may apply the one or more parameters associated with the external factors 406 to the initial behavior photo ID 402, resulting in the modified behavior photo ID 404.

In some implementations, updating may be based, at least in part, on any number of environmental or external factors and behavioral responses to those factors by the person. (In this context, a non-response by a person may in itself be considered a response.) Such an updating process 400 may be performed from time to time, periodically, in response to relatively significant environmental and/or behavioral changes, or in response to a request by the person or someone associated with the person.

A behavior photo ID that is based, at least partially, on the external factors 406 and behavioral responses to those factors by the person may be used to further uniquely identify the person. The person may browse particular types of internet sites depending on the time of year and type of leisure activities (e.g., an avid hiker may frequently browse weather sites during the summer). In another example, the person may send more text messages during non-work hours. In yet another example, time ranges of device inactivity may indicate sleeping patterns of the person (which may change from season to season). Such external factors and behavioral responses to those factors by the person may be encoded, as discussed above, in a behavior photo ID that uniquely identifies the person.

In some examples, a behavior photo ID that is based, at least partially, on the external factors 406 and behavioral responses to the external factors 406 by the person may be used to determine, for example, when an unauthorized person is using, for example, a phone. If a person loses their phone and a stranger attempts to use it, for example, the system can recognize relatively sudden changes in behavior of the person (e.g., apart from, or in addition to, "direct" responses to the external factors). Thus, the process 400 can compare the modified behavior photo ID 404 to the initial behavior photo ID 402 of a person, for example, to detect a possible unauthorized user.

Figure 5:
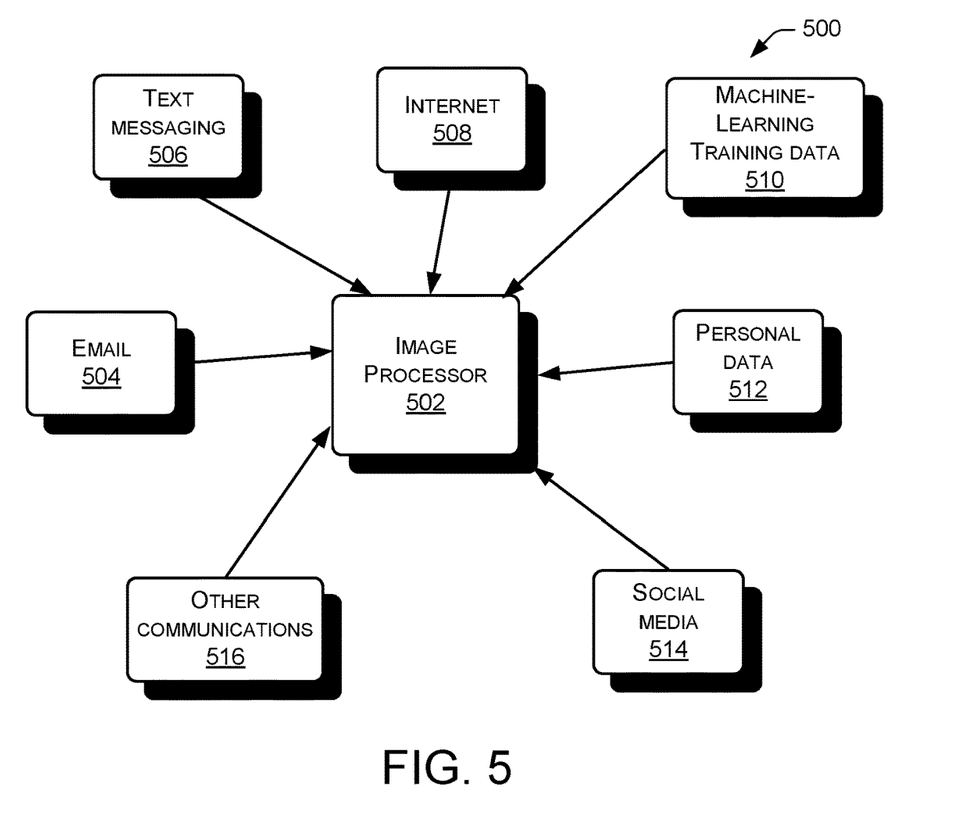
FIG. 5 is a schematic diagram of multiple information sources that may be used to produce or modify a behavior photo ID, in accordance with some examples of the present disclosure.

FIG. 5 is a schematic diagram of an example system 500 that includes multiple information sources 504-516, that may be used to produce or modify a behavior photo ID, according to some examples of the present disclosure. The system 500 may be a portion of system 100 illustrated in FIG. 1. System 500 includes an image processor 502 configured to receive information from the sources 504-516 and may also receive information from other sources. Such sources 504-516 may include host applications (e.g., internet browsers, SMS text editors, email applications, electronic calendar functions, etc.), databases or other information sources. In a particular example of the system 500, the sources 504-516 can include non-critical data from email 504, text messaging 506 (e.g., short messaging service (SMS) or multi-media messaging service (MMS)), the Internet 508, machine-learning training data 510, personal data 512, social media 514, and other communications 516. Rather than receiving the content, of other sensitive data, from any of these sources 504-516, the system can use anonymized and/or encrypted data regarding behavior surrounding these sources 504-516. In other words, the contents of a message or website is disregarded in favor of, for example, when a user connects, how many messages they send, how many different contacts they are regularly in contact with, etc. Thus, non-critical data refers to the behavior surrounding a text message 506, for example, as opposed to sensitive data such as the content or recipient of the text message 506, which not used and is not available to the system 500. The image processor 502 may be the same as, or similar to, the image processing module 116 in the computing device 102, illustrated in FIG. 1. In some examples, the image processor 502 may also include the function modules 210 and 408 and may be included in the processor 104.

The image processor 502 may be configured to analyze non-critical data and/or information provided by the sources 504-516 by applying any of a number of language or image analysis techniques (though a simple heuristical or rule-based systems may also be employed) to convert data into numerical, anonymized representations of the data for use by the system 500. The image processor 502 may be configured to analyze data or information provided by the Internet 508, the machine-learning training data 510, and other sources 504-516. The image processor 502 may also analyze non-critical data by applying language analysis to information or data collected from any of sources 504-516. The information collected by the image processor 502 may be used in any of the processes 200, 300, 400 for producing or updating a behavior photo ID for a person, as described above.

Figure 6:
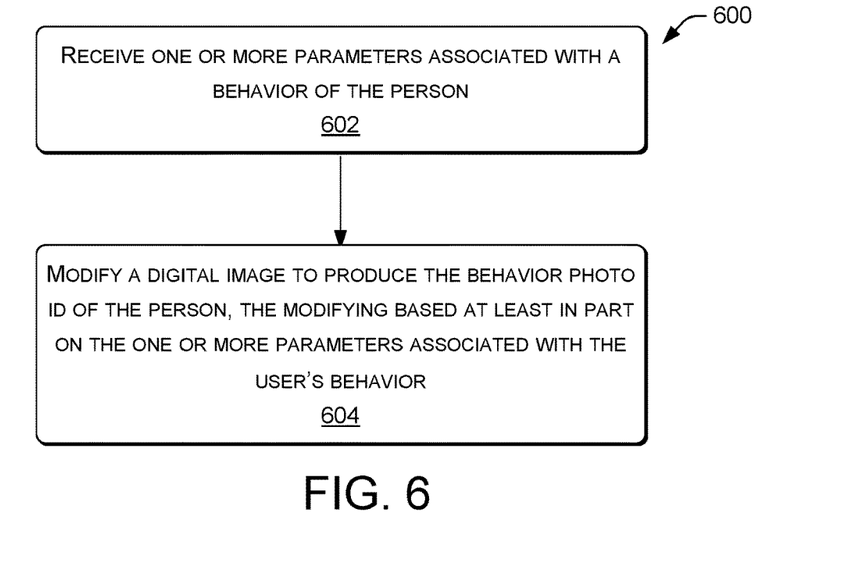
FIG. 6 is a flow diagram of a process for producing a behavior photo ID, in accordance with some examples of the present disclosure.

FIG. 6 is a flow diagram of a process 600 for producing a behavior photo ID 202, according to some examples of the present disclosure. The process 600 may be performed by the processor 104, illustrated in FIG. 1, for example, and may be performed in combination with one or more of the applications 118 including, for example, the image processor module 116 and/or the machine-learning module 114.

At block 602, the processor 104 may receive one or more parameters associated with the user's behavior 208 and/or external factors 406, among other things. The one or more parameters can include, for example, a history of times associated with internet use by the person. Such information may be provided by the sources 504-516 including, for example, the Internet 508, illustrated in FIG. 5. In another example, the one or more parameters associated with the behavior of the person may include a number of contacts stored in at least one device of the person. Such information may be provided by personal data 512, illustrated in FIG. 5.

At block 604, the processor 104 may modify a digital image to produce the behavior photo ID 202 of the person. This modifying may be based, at least in part, on the one or more parameters associated with the user's behavior 208, external factors 406, and other sources (e.g., sources 504-516). In some implementations, the processor 104 may receive an alleged behavior photo ID of the person. The processor 104 may determine whether or not to provide access to a person based on identification of the person by analyzing the alleged behavior photo ID. The processor 104 may thus compare the alleged behavior photo ID to the behavior photo ID 202 that is known to be of the person. Results of such comparison may be used to validate or invalidate the alleged behavior photo ID.

Figure 7:
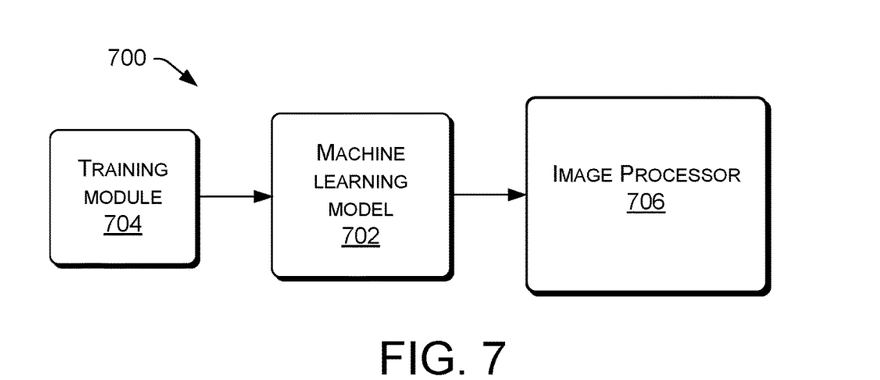
FIG. 7 is a block diagram of an example machine learning system, in accordance with some examples of the present disclosure.

FIG. 7 is a block diagram of a machine learning system 700, according to some examples of the present disclosure. The machine learning system 700 includes, for example, a machine learning model 702 (which may be similar to, or the same as, the machine-learning module 114 illustrated in FIG. 1), a training module 704, and an image processor 706 (which may be the same as or similar to image processor 502). And, although illustrated as separate blocks, in some examples, the image processor 706 may include the machine learning model 702. The machine learning model 702 may receive training data from training module 704. The training data may include data from a memory of a computing system that includes the machine learning system 700 or from the user's behavior 208, external factors 406, the sources 504-516, etc.

The memory may store data related to a person's activities on one or more devices (e.g., non-critical data associated with texts, emails, internet data received by and/or transmitted to one or more devices of the person). Regardless of the source, the data from the memory may be used to train the machine learning model 702. Subsequent to such training, the machine learning model 702 may be employed by the image processor 706. Thus, the data from a person's history of activities and other information may act as initial conditions for the machine learning model 702.

Figure 8:
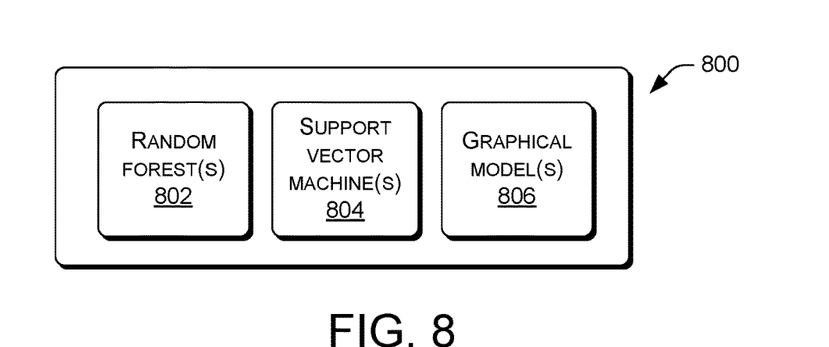
FIG. 8 is a block diagram of example machine learning models, in accordance with some examples of the present disclosure.

FIG. 8 is a block diagram of a machine learning model 800, according to various examples. The machine learning model 800 may be the same as, or similar to, the machine learning model 702 shown in FIG. 7. The machine learning model 800 can include any of a number of functional blocks, such as one or more random forest(s) 802, one or more support vector machine(s) 804, and one or more graphical model(s) 806. The random forest(s) 802 may include an ensemble learning method for classification that operates by constructing decision trees during training. The random forest(s) 802 may output the mode of the classes output by individual trees, for example. The random forest(s) 802 may also function as a framework including several interchangeable parts that can be mixed and matched to create a large number of particular models. Constructing a machine learning model in such a framework involves determining directions of decisions used in each node, determining types of predictors to use in each leaf, determining splitting objectives to optimize in each node, determining methods for injecting randomness into the trees, etc.

The support vector machine(s) 804 classify data for the machine learning model 800. The support vector machine(s) 804 may function as a supervised learning model with associated learning algorithms that analyze data and recognize patterns, which can be used for classification and regression analysis. Given a set of training data each marked as belonging to one of two categories, for example, a support vector machine training algorithm can build a machine learning model that assigns new training data into one category or the other.

The graphical model(s) 806 can function as a probabilistic model in which a graph denotes conditional dependence structures between random variables. Graphical models provide algorithms for discovering and analyzing structure in distributions and extract unstructured information. Applications of graphical models, which may be used to infer activities of a person (e.g., a user of a computing device), may include information extraction, speech recognition, image recognition, computer vision, and decoding of low-density parity-check codes, just to name a few examples.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

The invention claimed is:

1. A computer-implemented method for producing a behavior photographic identification ("behavior photo ID") of a person, the computer-implemented method comprising:
receiving one or more parameters associated with a behavior of the person including one or more behaviors that are unrelated to authentication; and
modifying a digital image to produce a modified digital image of the behavior photo ID of the person, the modifying based at least in part on the one or more parameters associated with the behavior of the person, wherein one or more parameters associated with the behavior of the person are unrelated to the digital image.

2. The computer-implemented method of claim 1, wherein the one or more parameters associated with the behavior of the person include one of:
one or more behaviors associated with a history of internet use by the person; or
a number of contacts stored in at least one device of the person.

3. The computer-implemented method of claim 1, further comprising:
receiving one or more updated parameters or new parameters associated with the behavior of the person; and
further modifying the digital image to produce a modified behavior photo ID of the person, the further modifying based at least in part on the one or more updated or new parameters.

4. The computer-implemented method of claim 1, further comprising:
further modifying the digital image to produce a modified behavior photo ID of the person, the further modifying based at least in part on a machine learning model using data associated with a history of the behavior of the person.

5. The computer-implemented method of claim 1, further comprising:
receiving an alleged behavior photo ID of the person; and
comparing the alleged behavior photo ID of the person to the behavior photo ID of the person to validate or invalidate the alleged behavior photo ID.

6. The computer-implemented method of claim 1, wherein the behavior photo ID of the person is a first behavior photo ID of the person, the computer-implemented method further comprising:
comparing the first behavior photo ID of the person to a second behavior photo ID of the person that was produced before the first behavior photo ID of the person to determine that the person is an unauthorized user.

7. The computer-implemented method of claim 1, further comprising receiving the digital image from the person prior to modifying the digital image to produce the behavior photo ID of the person.

8. An apparatus comprising:
a non-transitory storage medium; and
instructions stored in the non-transitory storage medium, the instructions being executable by the apparatus to:
receive one or more parameters associated with a behavior of a person including one or more behaviors that are unrelated to authentication; and
modify a digital image to produce a modified digital image of a behavior photo ID of the person, the modifying based at least in part on the one or more parameters associated with the behavior of the person, wherein the one or more parameters associated with the behavior of the person are unrelated to the digital image.

9. The apparatus of claim 8, wherein the one or more parameters associated with the behavior of the person include one of:
- one or more behaviors associated with a history of internet use by the person; or
- a number of contacts stored in at least one device of the person.

10. The apparatus of claim 8, wherein the instructions are further executable by the apparatus to:
- receive one or more updated parameters or new parameters associated with the behavior of the person; and
- further modify the digital image to produce a modified behavior photo ID of the person, the further modifying based at least in part on the one or more updated or new parameters.

11. The apparatus of claim 8, wherein the instructions are further executable by the apparatus to receive the digital image from the person prior to modifying the digital image to produce the behavior photo ID of the person.

12. The apparatus of claim 8, wherein the instructions are further executable by the apparatus to further modify the digital image to produce a modified behavior photo ID of the person, the further modifying based at least in part on a machine learning model using data associated with a history of the behavior of the person.

13. A wireless communication network comprising:
- one or more processors;
- a non-transitory storage medium; and
- instructions stored in the non-transitory storage medium, the instructions being executable by the one or more processors to:
  - receive one or more parameters associated with a behavior of a person including one or more behaviors that are unrelated to authentication; and
  - modify a digital image to produce a modified digital image of a behavior photo ID of the person, the modifying based at least in part on the one or more parameters associated with the behavior of the person, wherein the one more parameters associated with the behavior of the person are unrelated to the digital image.

14. The wireless communication network of claim 13, wherein the one or more parameters associated with the behavior of the person include one of:
- one or more behaviors associated with a history of internet use by the person; or
- a number of contacts stored in at least one device of the person.

15. The wireless communication network of claim 13, wherein the instructions are further executable by the one or more processors to:
- receive an alleged behavior photo ID of the person; and
- compare the alleged behavior photo ID of the person to the behavior photo ID of the person to validate or invalidate the alleged behavior photo ID.

16. The wireless communication network of claim 13, wherein the behavior photo ID of the person is a first behavior photo ID of the person and wherein the instructions are further executable by the one or more processors to:
- compare the first behavior photo ID of the person to a second behavior photo ID of the person that was produced before the first behavior photo ID of the person to determine a medical or mental condition of the person.

17. The wireless communication network of claim 13, wherein the instructions are further executable by the one or more processors to:
- receive the digital image from the person prior to modifying the digital image to produce the behavior photo ID of the person.

\* \* \* \* \*